United States Patent
Anand et al.

(10) Patent No.: US 8,407,499 B2
(45) Date of Patent: Mar. 26, 2013

(54) OPTIMIZING POWER MANAGEMENT IN PARTITIONED MULTICORE VIRTUAL MACHINE PLATFORMS BY UNIFORM DISTRIBUTION OF A REQUESTED POWER REDUCTION BETWEEN ALL OF THE PROCESSOR CORES

(75) Inventors: Vaijayanthimala K Anand, Austin, TX (US); Diane Garza Flemming, Austin, TX (US); William A Maron, Austin, TX (US); Mysore Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 12/763,431

(22) Filed: Apr. 20, 2010

(65) Prior Publication Data

US 2011/0258468 A1  Oct. 20, 2011

(51) Int. Cl.
  *G06F 1/32* (2006.01)
  *G06F 1/24* (2006.01)
  *G06F 9/00* (2006.01)

(52) U.S. Cl. .................. 713/320; 713/100; 713/1

(58) Field of Classification Search .................. 713/320
See application file for complete search history.

(56) References Cited

U.S. PATENT DOCUMENTS

| | | | |
|---|---|---|---|
| 7,500,126 | B2 | 3/2009 | Terechko et al. |
| 7,596,705 | B2 | 9/2009 | Kim |
| 7,657,766 | B2 | 2/2010 | Gonzalez et al. |
| 7,702,936 | B2 * | 4/2010 | Hack .............................. 713/320 |
| 8,209,554 | B2 * | 6/2012 | Parker et al. .................. 713/300 |
| 2004/0111596 | A1 * | 6/2004 | Rawson, III ...................... 713/1 |
| 2004/0215987 | A1 | 10/2004 | Farkas et al. |
| 2008/0301473 | A1 * | 12/2008 | Perez et al. .................... 713/300 |
| 2009/0265568 | A1 | 10/2009 | Jackson |
| 2011/0145555 | A1 * | 6/2011 | Nayar et al. ...................... 713/1 |

* cited by examiner

*Primary Examiner* — Suresh Suryawanshi
(74) *Attorney, Agent, or Firm* — J. B. Kraft; David A. Mims

(57) ABSTRACT

Handling requests for power reduction by first enabling a request for an amount of power change, e.g. reduction by any partition. In response to the request for power reduction, an equal proportion of the whole amount of power reduction is distributed between each of a set of cores providing the entitlements to the partitions, and the entitlement of the requesting partition is reduced by an amount corresponding to the whole amount of the power change.

17 Claims, 4 Drawing Sheets

OPTIMIZING POWER MANAGEMENT IN PARTITIONED MULTICORE VIRTUAL MACHINE PLATFORMS BY UNIFORM DISTRIBUTION OF A REQUESTED POWER REDUCTION BETWEEN ALL OF THE PROCESSOR CORES

TECHNICAL FIELD

The present invention relates to a virtualized system environment that includes a plurality of virtual machines implemented on the core processors in multicore platforms, each processor respectively runs on one of a plurality of virtual machines that provide application threads to be executed on the processor cores. The invention more particularly relates to power management for such virtual machine multicore platforms through distribution of requested power reductions.

BACKGROUND OF RELATED ART

Over the past generation, virtualization of computer processors has become commonplace. This virtualization involves time slicing of the virtual processors or machines between physical processors. In such virtual processor environments wherein multiple user computers, i.e. client devices, are connected to each virtual processor platform that provides a plurality of physical processors respectively connected to these, power management is important. This is particularly the case with current technology of multicore processors on a single integrated circuit chip, e.g. dual core chips. These multicore processors, when operating effectively, do reduce power consumption and, consequently, wasted heat. However, such multicore processors require tighter power management so as obtain maximum overall processor power per watt in a virtualized environment. It is consequently important to constrain power at all levels.

In the current state of virtualization technology, the multicore processors on a particular platform are controlled by a hypervisor so that a plurality of computer applications, concurrently running respectively on client computer/devices provide threads that in turn are run on the virtual logical processors with each logical processor being represented by a partition wherein each partition has an allocation known as an entitlement to at least a fraction of a core (physical processor). This entitlement is equivalent to a guarantee that the system or power management system administrator provides to a partition. This entitlement assures the particular partition that its MIPS (millions of instructions per second) will not be reduced without the agreement of the user or administrator of the partition. This presents problems when power efficiency management results in one or more partitions requesting a reduction in power. Since the micro-partitions share entitlement in the same core, as well as multicores sharing the same substrate, or share entitlement in a shared pool of multicores that may be spread out on multiple substrates (nodes), non-requesting partitions will be affected by such reductions in power of the shared processors. Currently, all micro-partitions may be particularly affected by requests for power reduction in selected micro-partitions.

SUMMARY OF THE PRESENT INVENTION

The present invention provides an implementation for effectively handling requests for power reduction in micro-partitioned virtual machine systems without impacting the guaranteed entitlement of the partitions that have not requested for power reduction.

The invention provides a solution for handling requests for power reduction comprising first enabling a request for an amount of power change, e.g. reduction, by any partition in a virtualized environment where processor resources are shared. In response to the request for power reduction, for example, an equal proportion of the whole amount of power reduction is distributed across all of the physical processors in the shared pools through frequency reduction and the entitlement of the requesting partition is reduced by an amount corresponding to the whole amount of the power change.

It is often the situation, wherein a plurality of partitions request a power reduction. In such a situation, an equal proportion of the whole amount of power reduction is still distributed between each of the set of partitions, but the entitlement of each of said requesting partitions is respectively reduced by an amount corresponding to the amount of said power reduction requested by each of said requesting partitions.

To compensate for the affect of the distributed power reduction of all of the processors shared by all partitions including non-requesting partitions, the entitlement of each non-requesting partition may be increased by an amount corresponding to the proportion of said power reduction of the shared processors.

As will be hereinafter described in greater detail, the process of the present invention is carried out under the control of a hypervisor and the hypervisor implements the request for an amount of power change by a partition.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
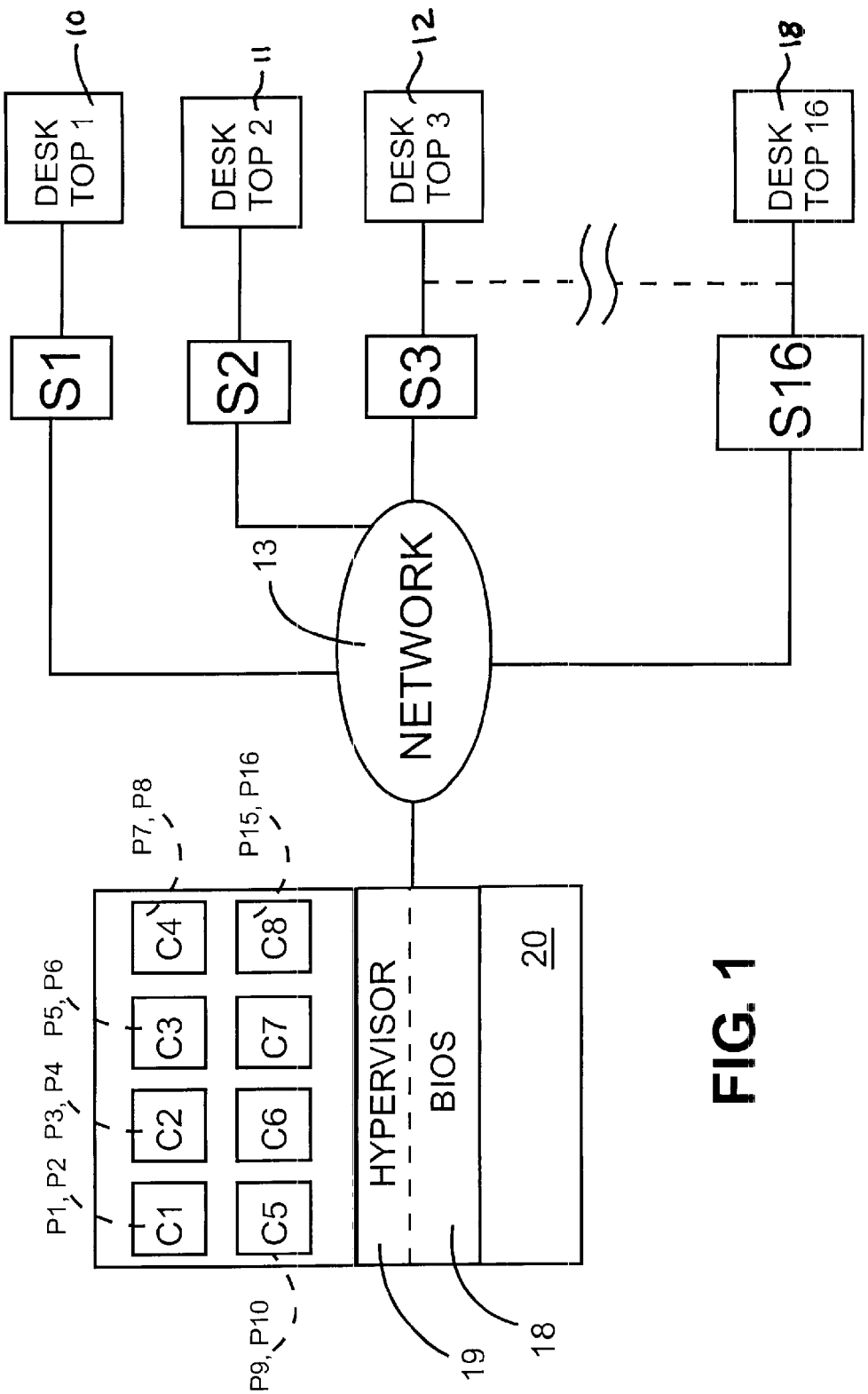
FIG. 1 is a generalized diagrammatic view of a network portion, including a set of multicore processors and a plurality of remote user computers or client devices connected to physical cores in the platform that may be used in the practice of the present invention.

Referring to FIG. 1, there is shown a generalized diagrammatic view of a network portion, including a set of multicore processors and a plurality of remote user computers or client devices connected to physical cores in the platform that may be used in the practice of the present invention. Platform 20 supports eight physical processors to be hereinafter referred as cores C1 through C8. These core structures may be implemented in current multicore technology with multicore processors on a single integrated circuit chip, e.g. dual core chips or even four core chips. The current implementation effectively uses Micro-Partitioning™ wherein a plurality of partitions may share a core processor. In FIG. 1: partitions P1, P2 share core C1; partitions P3, P4 share core C2; partitions P5, P6 share core C3; partitions P7, P8 share core C4; partitions P9, P10 share core C5; partitions P11, P12 share core C6; partitions P13, P14 share core C7; and partitions P15, P16 share core C4. With Micro-Partitioning, multiple logical partitions can be configured to share the system's processing power as implemented in the multiple cores. A partition can be set to use as little as 0.1 of a core (processor). One can specify the number of processing units to be allocated to a shared processor partition down to the hundredth of a processing unit. IBM's Micro-Partitioning™ technology can assign fractions of processing units to logical partitions. This technology optimizes the increased use of system resources by automatically applying the required amount of processor resource needed by each partition.

All of the above-described processes are carried out under the control of hypervisor 19 that also controls a shared pool (not shown) of processors (cores) not as yet dedicated or allocated to specific partitions. As will be hereinafter described in greater detail, the platform 20 including the hypervisor, and the power management implementations of this invention may be executed in IBM Corporation's Power7™ processing systems. The programs for the invention are affected in the hypervisor 19 and maintained in the BIOS 18 associated with the hypervisor.

The client computers providing the application threads to be run in partitions P1-P16 through allocations, i.e. entitlement to portions of cores C1-C8, may be desktop computers 10-13 (desktops 1-16), respectively connected to platform 20 through respective network servers S1-S16 via a network 13, such as the Internet. All of the distribution of the application threads from applications running on desktops 1-16 to cores via respective partitions P1-P16 to shared cores C1-C8, are controlled by hypervisor 19.

In the operation of the present invention, with respect to FIG. 1, an entitlement is an allocation that the system, via hypervisor 19, assigns to a partition, P1-P16, to at least a fraction of a core C1-C8. This entitlement represents a guarantee that a system administrator, through hypervisor 19 gives to each partition P1-P16, that the MIPS cannot be reduced unless the partition agrees to such a reduction.

In the operation, a condition may arise when one or more partitions requires an energy or power change, particularly a power reduction. In general, energy conservation and the optimization of power management toward such goals is a significant aspect of present day data processing, as exemplified in the energy management of power systems, e.g. Power7. In the various power saving functions of such systems, one or more partitions may require a power reduction; the present invention would handle such a request as follows.

Assume, for example, with respect FIG. 1 that partitions P1-P16 share cores C1-C8 so that each of partitions P1-P16 has an entitlement of half, i.e. 0.5 of its respective core C1-C8.

Now, partitions P1-P4, that share cores C1-C2, each require a 20% reduction in power. Since all of the partitions share the processors, the 20% reduction has to be distributed across the eight cores through frequency reduction that will thereby affect all 16 partitions. Thus:

20% times 4 (P1-P4 on cores C1-C2)=80% divided by 16 (P1-P16 on cores C1-C8)=5% power reduction for each partition;

The corresponding entitlement of P1-P4 will each be reduced 20% to 0.4 commensurate with the 20% power reduction; and The entitlement of partitions P5-P16 will be increased by 5% to 0.525 of a core to compensate for their non-required loss of power.

Figure 2:
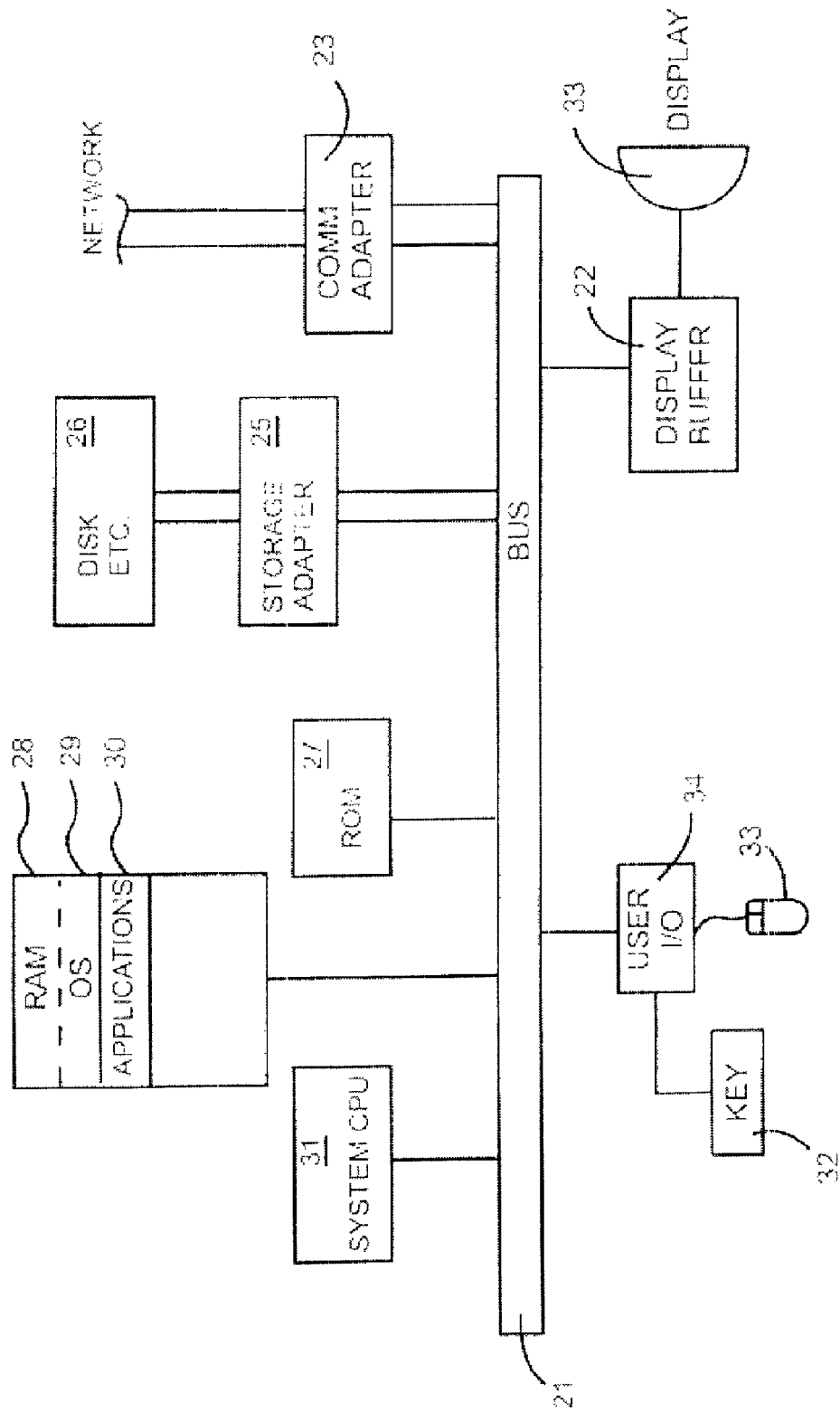
FIG. 2 is a illustrative diagrammatic view of a control processor that may be used for the platform hypervisor of FIG. 1, as well as for the servers for the desktop devices shown in FIG. 1.

With respect to FIG. 2, there is shown an illustrative diagrammatic view of a control processor that may be used for the platform hypervisor of FIG. 1. A central processing unit (CPU) 31, such as one of the microprocessors or workstations, e.g. System p™ series, eServerp5, eServer OpenPower™ or the PowerVM Standard edition, available from International Business Machines Corporation (IBM), is provided and interconnected to various other components by system bus 21. An operating system OS 29 (e.g. a Linux System) runs on CPU 31, provides control and is used to coordinate the function of the various components of FIG. 2. Operating system 29 may be one of the commercially available operating systems. Application programs 30, controlled by the system, are moved into and out of the main memory Random Access Memory (RAM) 28. These programming applications may be used to implement functions of the present invention. However, it is preferable that the programs used to implement the present invention be in the BIOS of the controlling hypervisor stored in a Read Only Memory (ROM) 27 connected to CPU 31 via bus 21. ROM 27 includes the Basic Input/Output System (BIOS) that controls the basic computer functions of the hypervisor. RAM 28, storage adapter 25 and communications adapter 23 are also interconnected to system bus 21. Storage adapter 25 communicates with the disk storage device 26. Communications adapter 23 interconnects bus 21 with an outside Web or like network. I/O devices are also connected to system bus 21 via user interface adapter 34. Keyboard 32 and mouse 33 may be connected to bus 21 through user interface adapter 34. Display buffer 22 supports display 33.

Figure 3:
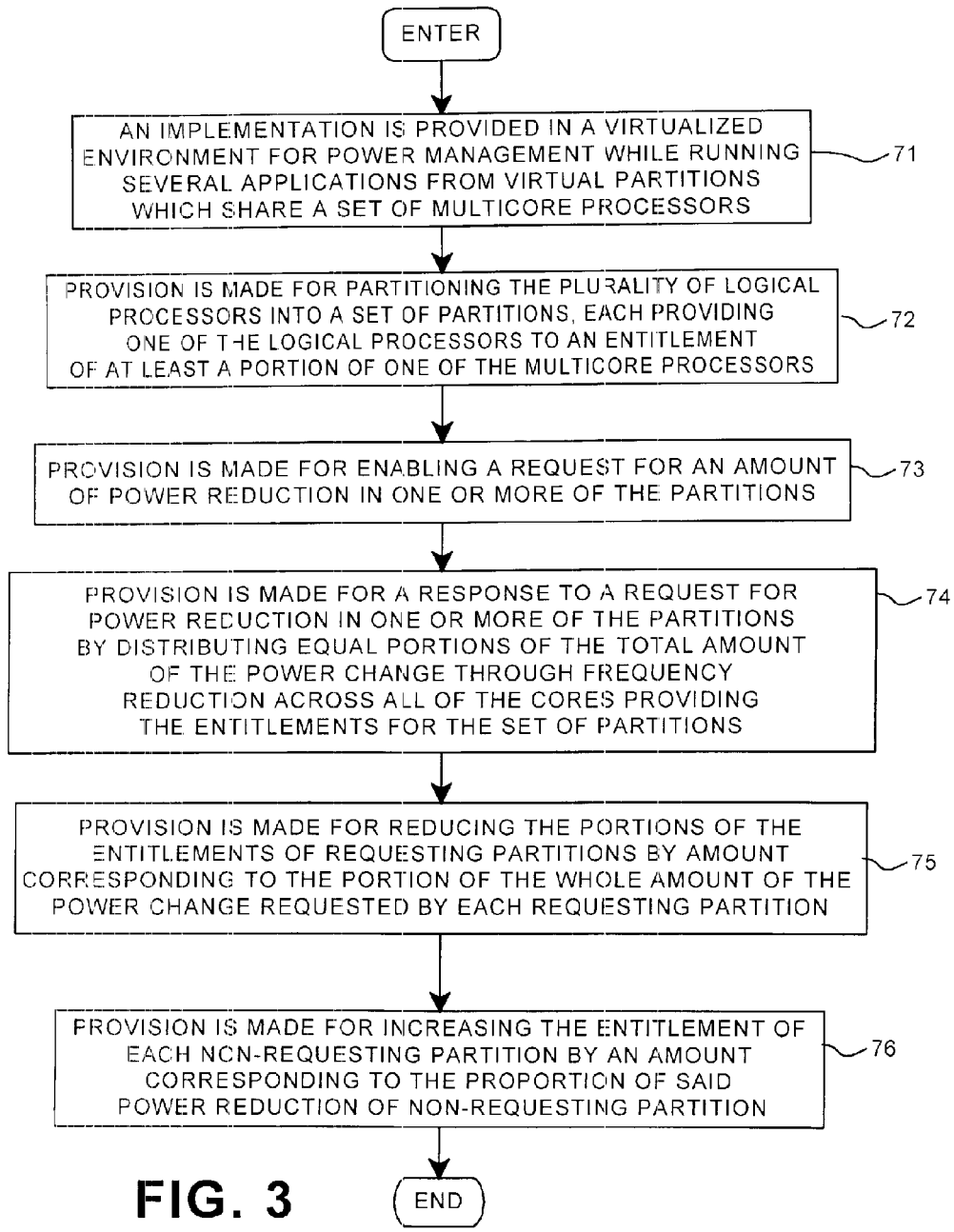
FIG. 3 is a general flowchart of a program set up to implement the present invention for power management in a virtualized system environment by distributing requested power reduction by one or more partitions among all of the partitions.

FIG. 3 is a general flowchart of a program set up to implement the present invention for power management in a virtualized environment by uniformly distributing the whole of a request for power reduction among all of the cores providing entitlement to the partitions. An implementation is provided in a virtualized environment for power management while running several applications from virtual partitions that share a set of multicore processors, step 71. Provision is made for partitioning a plurality of logical processors into a set of partitions, with each partition providing one of the logical processors to an entitlement of at least a portion of one of the multicore processors, step 72. Provision is made for enabling a request for an amount of power reduction from one or more of the partitions, step 73. Provision is made for a response to a request for power reduction in one or more partitions by distributing equal portions of the total amount of power reduction between each of the set of partitions through frequency reduction across all of the cores providing the entitlements, step 74. Provision is made for reducing the portions of the entitlement of the requesting partitions by an amount corresponding to the portion of the whole amount of the power change requested by each requesting partition, step 75. Provision is also made for increasing the entitlements of each non-requesting partition by an amount corresponding to the proportion of the power reduction of the non-requesting partition, step 76.

Figure 4:
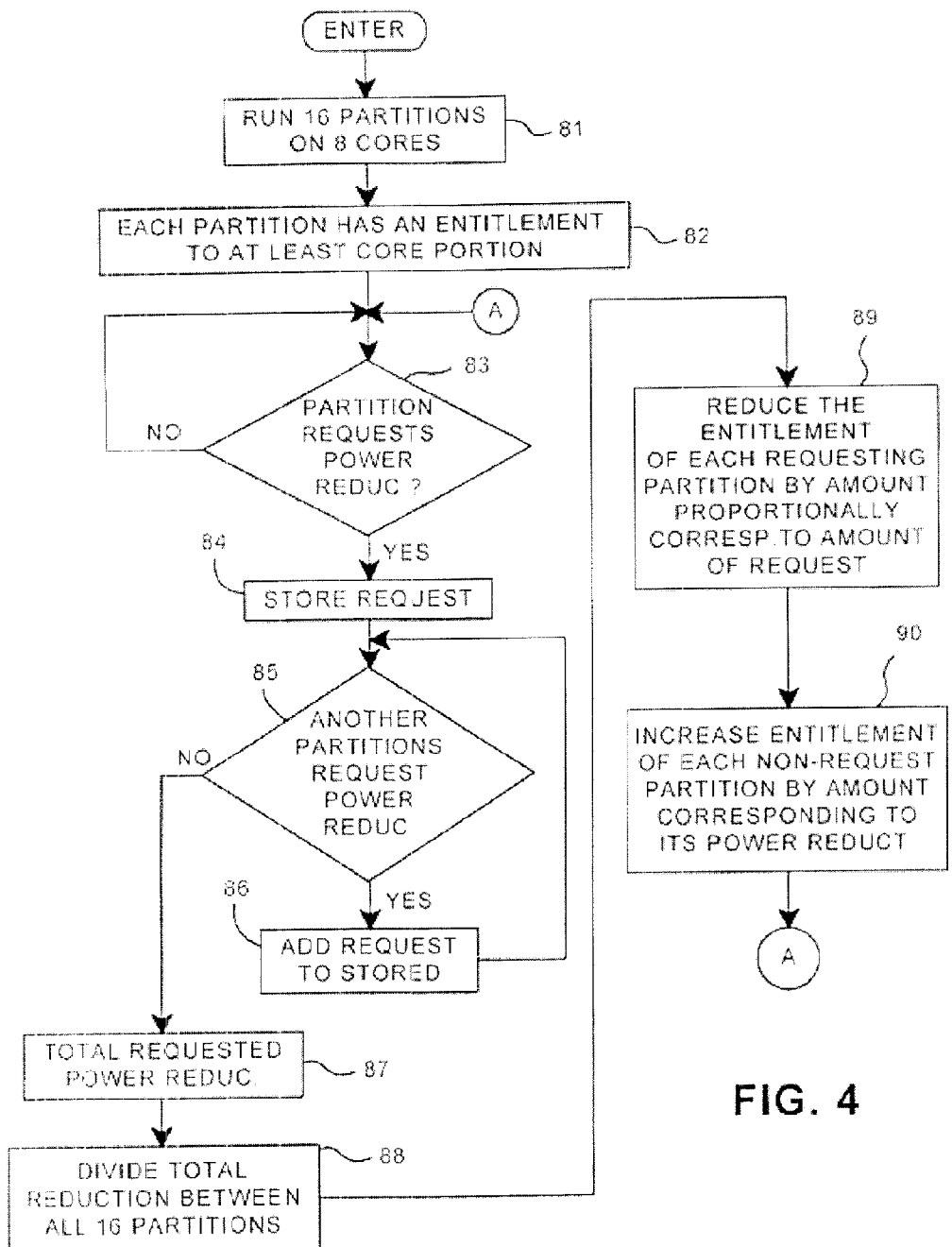
FIG. 4 is a flowchart of an illustrative run of the program set up in FIG. 3 for distributing requested power reduction by one or more partitions among all of the partitions.

A simple illustrative example of a run of the process set up in FIG. 3 is described with respect to the flowchart of FIG. 4. This routine is run under hypervisor control. 16 partitions, e.g. partitions P1-P16, of FIG. 1 are run on 8 cores C1-C8, step 81, wherein each of the partitions has an entitlement of at least a core portion, step 82. As the partitions are being run on the cores, a determination is made as to whether any partition has requested a power reduction, step 83. If Yes, the requested reduction is stored, step 84, and a further determination is made, step 85, as to whether another partition has also requested a power reduction. If Yes, step 86, this requested reduction is also stored, and the process is returned to step 85. If the determination in step 85 is No, i.e. that no further partitions have requested a power reduction, then, step 87, the stored requests for power reduction are totalled. The total power reduction is divided and applied to all 16 partitions, step 88. The entitlement of each requesting partition is reduced by an amount proportionally corresponding to its requested power reduction, step 89, and the entitlement of each non-requesting partition is increased by an amount corresponding to its power reduction. At this point the process is returned to step 83 via branch "A", the 16 partitions continue to run on the 8 cores according to this changed status while step 83 awaits any subsequent requests for power change.

Although certain preferred embodiments have been shown and described, it will be understood that many changes and modifications may be made therein without departing from the scope and intent of the appended claims.

What is claimed is:

1. A method for power management in a virtualized environment wherein a plurality of computer applications running concurrently on a plurality of virtual processors in partitions share a set of physical processors in a shared processor pool comprising:
    partitioning said plurality of logical processors into a set of partitions wherein each partition provides a logical processor to an entitlement of at least a portion of one of said set of physical processors;
    enabling a request for an amount of power change by a partition;
    responsive to said request for power change, distributing an equal proportion of the whole amount of power change by changing the frequency of all of the processors in said shared pool wherein each of said set of partitions is affected by said power change;
    reducing said entitlement of said requesting partition by an amount corresponding to the whole amount of said frequency change; and
    increasing the entitlement of each non-requesting partition by an amount corresponding to the proportion of said power reduction of processors used by said non-requesting partition.

2. The method of claim 1 wherein:
    said request for an amount of power change is for a reduction in the amount of power through frequency reduction; and
    said entitlement of said requesting partition is reduced by an amount corresponding to the whole amount of said power reduction.

3. The method of claim 2 wherein:
    a plurality of partitions request a power reduction;
    and said entitlement of each of said requesting partitions is respectively reduced by an amount corresponding to the amount of said power reduction requested by each of said requesting partitions.

4. The method of claim 2 wherein:
    said request is for percentage reduction in the amount of power required by the requesting partition;
    said percentage of reduction in power is divided equally across all of the processors in said shared pool through frequency reduction; and
    said percentage of said entitlement of said requesting partition is reduced by an percentage corresponding to the whole percentage of said power change.

5. The method of claim 2 wherein:
    said method is carried out under the control of a hypervisor; and
    said hypervisor implements said request for an amount of power change by a partition.

6. The method of claim 5 wherein each of said set of physical processors is a core in at least one multi-core integrated circuit component.

7. A computer controlled system for power management in a virtualized environment wherein a plurality of computer applications running concurrently on a plurality of virtual processors in partitions share a set of physical processors in a shared processor pool, said system for power management comprising:
    a processor; and
    a computer memory holding computer program instructions which when executed by the processor perform the method comprising:
    partitioning said plurality of logical processors into a set of partitions wherein each partition provides a logical processor to an entitlement of at least a portion of one of said set of physical processors;
    enabling a request for an amount of power change by a partition;
    responsive to said request for power change, distributing an equal proportion of the whole amount of power change by changing the frequency of all of the processors in said shared pool wherein each of said set of partitions is affected by said power change;
    reducing said entitlement of said requesting partition by an amount corresponding to the whole amount of said frequency change; and
    increasing the entitlement of each non-requesting partition by an amount corresponding to the proportion of said power reduction of processors used by said non-requesting partition.

8. The system of claim 7 wherein:
    said request for an amount of power change is for a reduction in the amount of power through frequency reduction; and
    said entitlement of said requesting partition is reduced by an amount corresponding to the whole amount of said power reduction.

9. The system of claim 8 wherein:
    a plurality of partitions request a power reduction;
    and said entitlement of each of said requesting partitions is respectively reduced by an amount corresponding to the amount of said power reduction requested by each of said requesting partitions.

10. The system of claim 8 wherein:
    said request is for percentage reduction in the amount of power required by the requesting partition;
    said percentage of reduction in power is divided equally across all of the processors in said shared pool through frequency reduction; and
    said percentage of said entitlement of said requesting partition is reduced by an percentage corresponding to the whole percentage of said power change.

11. The system of claim 8 further including a hypervisor for implementing said request for an amount of power change by a partition.

12. The system of claim 5 wherein each of said set of physical processors is a core in at least one multi-core integrated circuit component.

13. A computer usable non-transitory storage medium having stored thereon a computer readable program for power management in a virtualized environment wherein a plurality of computer applications running concurrently on a plurality of virtual processors in partitions share a set of physical processors in a shared processor pool, wherein the computer readable program when executed on a computer causes the computer to:
- partition said plurality of logical processors into a set of partitions wherein each partition provides a logical processor to an entitlement of at least a portion of one of said set of physical processors;
- enable a request for an amount of power change by a partition;
- responsive to said request for power change, distribute an equal proportion of the whole amount of power change by changing the frequency of all of the processors in said shared pool wherein each of said set of partitions is affected by said power change;
- reduce said entitlement of said requesting partition by an amount corresponding to the whole amount of said frequency change; and
- increase the entitlement of each non-requesting partition by an amount corresponding to the proportion of said power reduction of processors used by said non-requesting partition.

14. The computer usable medium of claim 13 wherein:
said request for an amount of power change is for a reduction in the amount of power through frequency reduction; and
said entitlement of said requesting partition is reduced by an amount corresponding to the whole amount of said power reduction.

15. The computer usable medium of claim 14 wherein:
a plurality of partitions request a power reduction;
and said entitlement of each of said requesting partitions is respectively reduced by an amount corresponding to the amount of said power reduction requested by each of said requesting partitions.

16. The computer usable medium of claim 14 wherein:
said request is for percentage reduction in the amount of power required by the requesting partition;
said percentage of reduction in power is divided equally across all of the processors in said shared pool through frequency reduction; and
said percentage of said entitlement of said requesting partition is reduced by an percentage corresponding to the whole percentage of said power change.

17. The computer usable medium of claim 14 wherein said program is executed under the control of a hypervisor; and
said hypervisor implements said request for an amount of power change by a partition.

* * * * *